United States Patent
Kim et al.

(10) Patent No.: US 12,101,664 B2
(45) Date of Patent: Sep. 24, 2024

(54) DEVICE FOR TRANSMITTING DATA IN WIRELESS AV SYSTEM AND DEVICE FOR RECEIVING DATA IN WIRELESS AV SYSTEM

(71) Applicant: LG ELECTRONICS INC., Seoul (KR)

(72) Inventors: Seongyeon Kim, Seoul (KR); Jinmin Kim, Seoul (KR); Jaewook Song, Seoul (KR); Jinsoo Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 333 days.

(21) Appl. No.: 17/595,965

(22) PCT Filed: Jun. 28, 2019

(86) PCT No.: PCT/KR2019/007873
§ 371 (c)(1),
(2) Date: Nov. 30, 2021

(87) PCT Pub. No.: WO2020/262740
PCT Pub. Date: Dec. 30, 2020

(65) Prior Publication Data
US 2022/0232417 A1 Jul. 21, 2022

(51) Int. Cl.
*H04W 28/04* (2009.01)
*H04L 5/00* (2006.01)
(Continued)

(52) U.S. Cl.
CPC ........... *H04W 28/04* (2013.01); *H04L 5/0055* (2013.01); *H04W 28/14* (2013.01); *H04W 72/23* (2023.01)

(58) Field of Classification Search
CPC ..... H04W 28/04; H04W 72/23; H04W 28/14; H04W 36/02; H04W 72/1221;
(Continued)

(56) References Cited

U.S. PATENT DOCUMENTS

2009/0252143 A1* 10/2009 Sridhara ............... H04L 1/1887
370/345
2013/0329658 A1 12/2013 Liu
(Continued)

FOREIGN PATENT DOCUMENTS

| JP | 2013251614 | 12/2013 |
| JP | 2016006955 | 1/2016 |
| KR | 20150055007 | 5/2015 |

OTHER PUBLICATIONS

PCT International Application No. PCT/KR2019/007873, International Search Report dated Mar. 27, 2020, 6 pages.
(Continued)

*Primary Examiner* — Mewale A Ambaye
(74) *Attorney, Agent, or Firm* — LEE, HONG, DEGERMAN, KANG & WAIMEY

(57) ABSTRACT

A device for transmitting data in a wireless AV system, and a device for receiving data in a wireless AV system. The device includes: a transceiver configured to receive, from an initiator, a forward direction data frame and reverse direction grant information, instructing that reverse direction transmission be allowed, within a transmission opportunity acquired by the initiator, generate and transmit to the initiator, a block ACK frame pertaining to the forward direction data frame, and buffer a reverse direction data frame to be transmitted to the initiator; and a processor connected to the transceiver and configured to acquire AV data from the forward direction data frame.

11 Claims, 7 Drawing Sheets

(51) Int. Cl.
*H04W 28/14* (2009.01)
*H04W 72/23* (2023.01)

(58) Field of Classification Search
CPC ....... H04W 72/12; H04W 72/14; H04W 4/80; H04L 5/0055; H04N 21/43615; H04N 21/4363
See application file for complete search history.

(56) References Cited

U.S. PATENT DOCUMENTS

| | | |
|---|---|---|
| 2014/0010211 A1 | 1/2014 | Asterjadhi et al. |
| 2014/0029453 A1* | 1/2014 | Trainin ................. H04W 24/10 370/252 |
| 2014/0079016 A1* | 3/2014 | Dai ...................... H04L 5/0041 370/329 |
| 2018/0019792 A1* | 1/2018 | Yang .................... H04W 72/23 |
| 2019/0274166 A1* | 9/2019 | Seok ..................... H04W 88/08 |
| 2020/0008089 A1* | 1/2020 | Yun ....................... H04W 52/58 |
| 2020/0098186 A1* | 3/2020 | Xue ................... H04N 21/6587 |

OTHER PUBLICATIONS

European Patent Office Application Serial No. 19934734.5, Search Report dated Dec. 13, 2022, 9 pages.

* cited by examiner (A)

(B)

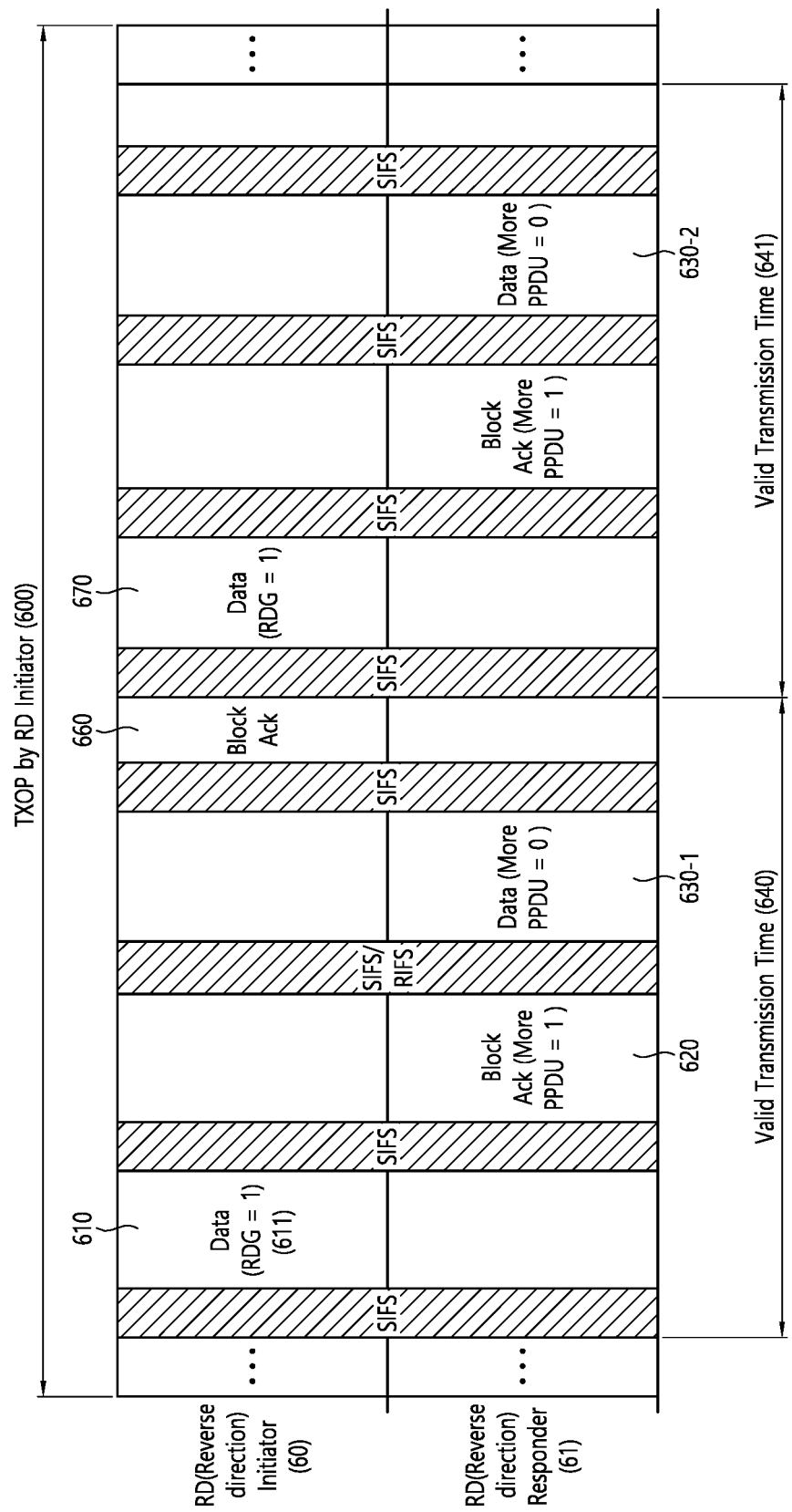

DEVICE FOR TRANSMITTING DATA IN WIRELESS AV SYSTEM AND DEVICE FOR RECEIVING DATA IN WIRELESS AV SYSTEM

CROSS-REFERENCE TO RELATED APPLICATIONS

This application is the National Stage filing under 35 U.S.C. 371 of International Application No. PCT/KR2019/007873, filed on Jun. 28, 2019, the contents of which is hereby incorporated by reference herein in its entirety.

BACKGROUND

Field of the Disclosure

The present disclosure relates to wireless communication, and more specifically, to an apparatus and method for transmitting data and an apparatus and method for receiving data in a wireless audio/video (WAV) system.

Related Art

Recently, demand for high-definition and high-quality images such as high definition (HD) images and ultra-high definition (UHD) images has increased in various fields. Since the amount of information or bits to be transmitted relatively increases as image data becomes high-definition and high-quality data, transmission cost may increase when image data is transmitted using a medium such as a conventional wired/wireless broadband line.

Meanwhile, the Institute of Electrical and Electronics Engineers (IEEE) 802.11ad standard is a high-speed wireless communication standard operating in a band of 60 GHz or higher. It has signal coverage of about 10 meters but can support throughput of 6 Gbps or more. Since it operates in a high frequency band, signal propagation is dominated by ray-like propagation. Signal quality can be improved as a transmit (TX) or receive (RX) antenna beam is aligned toward a strong spatial signal path. Currently, the IEEE 802.11ay standard, an evolved version of IEEE 802.11ad, is under development.

An existing standard such as IEEE 802.11ad or ay series premises multiple access and communication of a plurality of devices. On the other hand, an application of a wireless audio video (AV) system is generally designed on the premise of 1:1 wireless communication (e.g., communication between a wireless set-top box and a wireless TV). Therefore, it is difficult to expect efficient image data transmission when the existing standard is directly applied to the wireless AV system.

Accordingly, a procedure of operating the wireless AV system and a communication design method optimized for implementing this procedure are required.

SUMMARY

The present disclosure provides a scheduling method of a data transmission device and reception device in a wireless audio video (AV) system.

The present disclosure also provides a data transmission device and reception device supporting a reverse transmission protocol in a wireless AV system.

The present disclosure also provides a data transmission device and reception device performing forward data retransmission in a wireless AV system by suppressing reverse data frame transmission despite a reverse direction grant (RDG).

According to an aspect of the present disclosure, there is provided an apparatus for performing data transmission and reception in a wireless AV system. The apparatus includes a communication unit configured to receive from an initiator a forward data frame and reverse direction grant information indicating permission of reverse transmission within a transmission opportunity (TXOP) obtained by the initiator, generate a block ACK frame for the forward data frame to transmit the block ACK frame to the initiator, and buffer a reverse data frame to be transmitted to the initiator, and a processor coupled to the communication unit and configured to obtain AV data from the forward data frame. Herein, the communication unit may set a value of a more data field indicating whether the reverse data frame is present, based on whether at least part of the forward data frame fails in reception and priorities of the forward data frame and the reverse data frame, and may transmit the more data field to the initiator.

In an aspect, if the communication unit fails in reception of at least part of the forward data frame, and the forward data frame has a higher priority than the reverse data frame, the communication unit may set the value of the more data field to indicate that the reverse data frame is not present, even if the reverse data frame is buffered.

In another aspect, if the communication unit fails in reception of at least part of the forward data frame, and the forward data frame has a higher priority than the reverse data frame, the communication unit may set the value of the more data field to indicate that a transmission timing of the reverse data frame is delayed.

As an apparatus for performing data transmission and reception in an AV system, the apparatus includes:

a communication unit configured to receive from an initiator a forward data frame and RDG information indicating permission of reverse transmission within a TXOP obtained by the initiator, generate a block ACK frame for the forward data frame to transmit the block ACK frame to the initiator, and buffer a reverse data frame to be transmitted to the initiator; and a processor coupled to the communication unit and configured to obtain AV data from the forward data frame, wherein the communication unit sets a value of a more data field indicating whether the reverse data frame is present, based on whether at least part of the forward data frame fails in reception and priorities of the forward data frame and the reverse data frame, and transmits the more data field to the initiator.

In another aspect, the communication unit may delay the transmitting timing of the buffered reverse data frame within a valid transmission time. The valid transmission time may be designed as a time in which data transmitted by the initiator can be validly used.

In another aspect, if the communication fails in reception of at least part of the forward data frame, the communication unit may set the block ACK to NACK so that the forward data frame is received again from the initiator.

In another aspect, if the communication unit succeeds in reception of the forward data frame, the communication unit may set the value of the mode data field to indicate that the reverse data frame is present, and may transmit at least part of the reverse data frame within a valid transmission time.

In another aspect, if it is determined that the reverse data frame is transmitted by exceeding the valid transmission time, the communication unit may transmit a first part of the reverse data frame within the valid transmission time, and may delay a transmission timing of a second part which is the remaining part of the reverse data frame to a next valid transmission time.

In another aspect, the forward data frame may be data stored in a buffer of the initiator. The buffer of the initiator may be updated to new data in units of a valid transmission time.

According to another aspect of the present disclosure, there is provided an apparatus of performing data transmission and reception in a wireless AV system. The apparatus includes a communication unit configured to obtain a TXOP for transmitting to a responder a forward data frame to be buffered, transmit to the responder the forward data frame and RDG information indicating permission of reverse transmission within the TXOP, and receive from the responder a block ACK frame for the forward data frame, and a processor coupled to the communication unit and coupled to transfer AV data for the forward data frame to the communication unit. The communication unit may receive from the responder a value of a more data field indicating whether the reverse data frame is present, based on whether at least part of the forward data frame fails in reception and priorities of the forward data frame and the reverse data frame.

In an aspect, if the responder fails in reception of at least part of the forward data frame, and the forward data frame has a higher priority than the reverse data frame, the value of the more data field may be set to indicate that the reverse data frame is not present, even if the reverse data frame is buffered.

In another aspect, if the responder fails in reception of at least part of the forward data frame, and the forward data frame has a higher priority than the reverse data frame, the value of the more data field may be set to indicate to the responder that a transmission timing of the buffered reverse data frame is delayed.

In another aspect, the transmitting timing of the buffered reverse data frame may be delayed within a valid transmission time. The valid transmission time may be designed as a time in which the forward data frame can be validly used by the responder.

In another aspect, if the responder fails in reception of at least part of the forward data frame, the communication unit may retransmit the forward data frame to the responder.

In another aspect, if the responder succeeds in reception of the forward data frame, and the value of the more data field indicate that the revere data frame is present, the communication unit may receive at least part of the revere data frame within a valid transmission time.

In another aspect, if it is determined that the reverse data frame is transmitted by exceeding the valid transmission time, the communication unit may receive a first part of the reverse data frame within the valid transmission time, and may delay a reception timing of a second part which is the remaining part of the reverse data frame to a next valid transmission time.

In another aspect, the forward data frame to be buffered may be updated to new data in units of a valid transmission time.

There is an advantage in that a reverse data frame can be transmitted while enabling retransmission of a forward data frame within a valid transmission time even if transmission of the forward data frame fails, when a reverse direction grant is activated in the wireless AV system supporting a reverse direction grant protocol.

BRIEF DESCRIPTION OF THE DRAWINGS

FIG. 6 and FIG. 7 illustrate a communication procedure based on a reverse direction protocol in a wireless AV system according to another embodiment.

DESCRIPTION OF EXEMPLARY EMBODIMENTS

Figure 1:
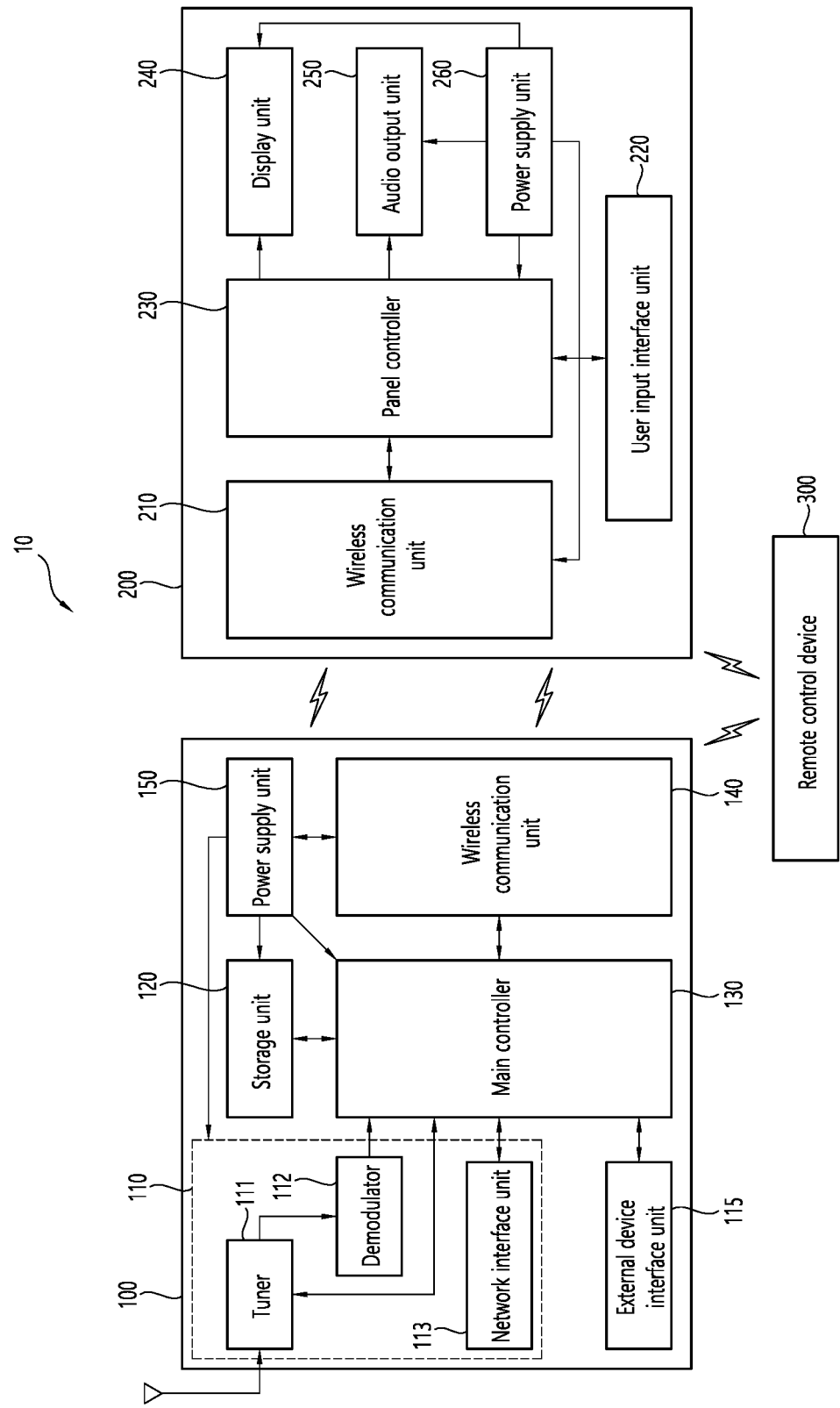
FIG. 1 is a block diagram of a wireless AV system according to an embodiment of the present disclosure.

The following detailed description illustrates embodiments of a device and method for transmitting wireless data and embodiments of a device and method for receiving wireless data that are provided according to the present disclosure. And, such embodiments do not represent the only forms of the present disclosure. The characteristics and features of the present disclosure are described with reference to exemplary embodiments presented herein. However, functions and structures that are similar or equivalent to those of the exemplary embodiments described in the present specification may be included in the scope and spirit of the present disclosure and may be achieved by other intended embodiments. Throughout the present specification, similar reference numerals will be used to refer to similar components or features. Hereinafter, embodiments of the present disclosure will be described in detail with reference to the accompanying drawings.

In recent years, the design of display devices, such as TVs, has become important, and display panels have become thinner with the development and evolution of technologies for display panels, such as OLED. However, due to the thickness of a driving circuit that is required in order to drive a display panel, there have been restrictions (or limitations) in manufacturing and designing thinner display panels. Therefore, a technology that is capable of separating components excluding components that are mandatorily required to be physically and electrically connected to the display panel, from the display panel, and equipping the physically or electrically separated components to a separate device (hereinafter referred to as a "main device") is being considered as a promising technology. In this case, a main device and a display device may be configured to exchange image signals and audio signals based on a wireless communication between the main device and the display device. The present disclosure relates to a wireless AV system, or a wireless display system being equipped with a main device and a display device that are provided as physically and/or electrically independent components, wherein media may be played (or reproduced) based on a wireless communication between the devices.

FIG. 1 is a block diagram of a wireless AV system according to an embodiment of the present disclosure.

Referring to FIG. 1, a wireless AV system 10 may include a main device 10, a display panel device 200, and a remote control device 300.

The main device 100 may perform an operation of receiving an external signal in a wired or wireless format that is related to audio, video, pictures, images, multimedia, or at least one combination thereof, processing the received external signal by using various methods, so as to generate a data stream or a bitstream, and transmitting the generated data stream or bitstream to the display device 200.

In order to perform such operation, the main device 100 may include an external signal receiver 110, an external device interface unit 115, a storage unit 120, a main controller 130, a wireless communication unit 140, and a power supply unit 150.

The external signal receiver 110 may include a tuner 111, a demodulator 112, and a network interface unit 113.

The tuner 111 receives an external signal in a wired or wireless format that is related to audio, video, pictures, images, multimedia, or at least one combination thereof. For example, the tuner 111 may select a specific broadcast channel in accordance with a channel selection command and may receive a broadcast signal corresponding to the selected specific broadcast channel.

The demodulator 112 may separate the received broadcast signal to a video signal, an image signal, a picture signal, an audio signal, and a data signal related to a broadcast program. And, then, the demodulator 112 may reconstruct (or restore or recover) the separated video signal, image signal, picture signal, audio signal, and data signal to a format that can be outputted.

The external device interface unit 115 may receive an application or an application list of a nearby (or neighboring) external device and may deliver (or communicate) the application or application list to the main controller 130 or storage unit 120.

The external device interface unit 115 may provide a connection path between the wireless AV system 100 and an external device. The external device interface unit 115 may receive an external input signal including audio, video, pictures, images, multimedia, or at least one combination thereof from an external device, which is connected to the main device 100 via wired or wireless connection, and may then deliver the received external input signal to the main controller 130. The external device interface unit 115 may include multiple external input terminals. The multiple external input terminals may include an RF terminal, an RGB terminal, one or more High Definition Multimedia Interface (HDMI) terminals, a USB terminal, a component terminal, an AV terminal, a CI terminal.

An external device that is connectable to the external device interface unit 115 may be any one of a set-top box, a Bluray player, a DVD player, a gaming system, a sound bar, a smart phone, a PC, a USB memory, a home theater system. However, these are merely exemplary.

The network interface unit 113 may provide an interface for connecting the main device 100 to a wired/wireless network including an internet network. The network interface unit 113 may transmit or receive data to or from another user or another electronic device through an accessed network or another network that is linked to the accessed network.

Additionally, some content data stored in the main device 100 may be transmitted to a user or an electronic device, which is selected from other users or other electronic devices that are pre-registered in the main device 100.

The network interface unit 113 may access a predetermined webpage through an accessed network or another network that is linked to the accessed network. That is, the network interface unit 113 may transmit or receive data to or from a corresponding server by accessing a predetermined webpage through the network.

Also, the network interface unit 113 may receive contents or data provided from a content provider or a network operator. That is, the network interface unit 113 may receive contents such as movies, advertisements, games, VODs, and broadcast signals, which are provided from a content provider or a network provider, and related information through the network.

Additionally, the network interface unit 113 may receive firmware update information and update files provided from a network operator and may transmit data to an internet or content provider or a network operator.

The network interface unit 113 may select and receive a wanted application among applications that are open to public, through the network.

The storage unit 120 may store programs for performing processing and control of each signal within the main controller 130, and then the storage unit 120 may store signal-processed image, voice, or data signals.

Additionally, the storage unit 120 may perform a function for temporarily storing image, voice, or data signals that are inputted from the external device interface unit 115 or network interface unit 113, and the storage unit 120 may also store information related to a predetermined image through a channel memory function.

The storage unit 120 may store an application or an application list that is inputted from the external device interface unit 115 or network interface unit 113.

The main controller 130 may control the main device 100 by using a user instruction (or command) that is inputted through the remote control device 300, or by using an internal program, and may access a network in order to be capable of downloading an application or an application list that is wanted by a user to the main device 100.

The main controller 130 enables user-selected channel information to be outputted along with a processed image or audio signal through a display device 200 or an audio output unit 250.

Additionally, the main controller 130 enables an image signal or audio signal, which is inputted from an external device, e.g., a camera or camcorder, through the external device interface unit 115, to be outputted through the display device 200 or audio output unit 250 in accordance with according to an external device image playback instruction (or command) that is received through the remote control device 300.

The main controller 130 may perform a control operation so that content stored in the storage unit 120, received broadcast content, or externally input content can be played back (or reproduced). Such content may be configured in various formats, such as a broadcast image, an externally inputted image, an audio file, a still image, an accessed (or connected) web screen, a document file, and so on.

The main controller 130 may decode a video, an image, a picture, a sound, or data related to a broadcast program being inputted through the demodulator 112, the external device interface unit 115, or the storage unit 120. Then, the main controller 130 may process the decoded data in accordance with encoding/decoding methods supported by the display device 200. Thereafter, the main controller 130 may process the encoded data by using various video/audio processing methods, such as compression and encoding, so as to transmit the corresponding data through a wireless channel, thereby generating a data stream or bitstream. Finally, the main controller 130 may transmit the generated data stream or bitstream to the display device 200 through the wireless communication unit 140. Depending upon the embodiments, the main controller 130 may also bypass the decoded data, without encoding the decoded data in accordance with the encoding/decoding methods supported by the display device 200, and may directly transmit the decoded data to the display device 200 through the wireless communication unit 140.

The main controller 130 may be configured to implement the functions, procedures, and/or methods of a processor 1130 of a wireless data transmitting device 1100 that are to be described with reference to each embodiment of the present specification. Layers of the wireless interface protocol may be implemented in the processor 1130. The main controller 130 may be provided in the form of a system on chip (SoC).

The wireless communication unit 140 may be operatively coupled to the main controller 130, for example, as a combination of a wireless communication chip and an RF antenna. The wireless communication unit 140 may receive a data stream or bitstream from the main controller 130, may generate a wireless stream by encoding and/or modulating the data stream or bitstream into a format that can be transmitted through a wireless channel, and may transmit the generated wireless stream to the display device 200. The wireless communication unit 140 establishes a wireless link, and the main device 100 and the display device 200 are connected through the wireless link. The wireless communication unit 140 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication unit 140 may perform communication by using a communication protocol, such as a standard of the IEEE 802.11 series.

The power supply unit 150 supplies power to the external signal receiver 110, the external device interface unit 115, the storage unit 120, the main controller 130, and the wireless communication unit 140. Methods for receiving power from an external source performed by the power supply unit 150 may include a terminal method and a wireless method. In case the power supply unit 150 receives power by using a wireless method, the power supply unit 150 may include a separate configuration in order to wirelessly receive power. For example, the power supply unit 150 may include a power pick-up unit configured to be magnetically coupled with an external wireless power transmitting device so as to receive wireless power, and a separate communication and control unit configured to perform communication with the wireless power transmitting device in order to receive wireless power and to control transmission and reception of wireless power.

The wireless communication unit 140 may also be wirelessly connected to the remote control device 300, thereby being capable of transferring (or delivering) signals inputted by the user to the main controller 130 or transmitter (or delivering) signals from the main controller 130 to the user. For example, the wireless communication unit 140 may receive or process control signals, such as power on/off, screen settings, and so on, of the main device 100 from the remote control device 300 or may process control signals received from the main controller 130 so that the processed signals can be transmitted to the remote control device 300 in accordance with various communication methods, such as Bluetooth, Ultra Wideband (WB), ZigBee, Radio Frequency (RF), or Infrared (IR) communication, and so on.

Additionally, the wireless communication unit 140 may deliver (or communicate) control signals that are inputted from a local key (not shown), such as a power key, a volume key, a setup key, and so on, to the main controller 130.

Subsequently, the display device 200 may process a wireless stream, which is received from the main device 100 through a wireless interface, by performing a reverse process of a signal processing operation that is performed by the main device 100, and then, the display device 200 may output a display or audio (or sound). In order to perform such operation, the display device 200 may include a wireless communication unit 210, a user input interface unit 220, a panel controller 230, a display unit 240, an audio output unit 250, and a power supply unit 260.

The wireless communication unit 210 may be configured as a combination of a wireless communication chip and an RF antenna. The wireless communication unit 210 is connected to the wireless communication unit 140 of the main device 100 through a wireless link and performs wireless communication with the wireless communication unit 140 of the main device 100. More specifically, the wireless communication unit 210 receives a wireless stream from the wireless communication unit 140 of the main device 100, demodulates the received wireless stream, and transmits the demodulated wireless stream to the panel controller 230. The wireless communication unit 210 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication unit 210 may perform communication by using a communication protocol, such as a standard of the IEEE 802.11 series.

The panel controller 230 decodes a signal that is demodulated by the wireless communication unit 210 so as to reconstruct (or recover) a bitstream or data stream. At this point, in case the bitstream or data stream is a compressed stream, the panel controller 230 may decompress or reconstruct the bitstream or data stream. Thereafter, the panel controller 230 may output the bitstream or data stream as a video signal, an image signal, a picture signal, an audio signal, or a data signal related to a broadcast program, and may transmit the signals to the display unit 240, the audio output unit 250, and the user input interface unit 220.

The video signal, the picture signal, the image signal, and so on, that are inputted to the display unit 240 may be displayed as a picture corresponding to the inputted picture signal. Alternatively, the picture signal that is processed by the panel controller 230 may be transmitted back to the main device 100 through the wireless communication unit 210 and may then be inputted to an external output device through the external device interface unit 115 of the main device 100.

The audio signal that is processed by the panel controller 230 may be audio-outputted to the audio output unit 250. Moreover, the audio signal that is processed by the panel controller 230 may be transmitted back to the main device 100 through the wireless communication unit 210 and may then be inputted to an external output device through the external device interface unit 115 of the main device 100.

Meanwhile, the panel controller 230 may control the display unit 240 so as to display a picture (or image). For example, the panel controller 230 may perform control operation, so that a broadcast picture (or image) that is inputted through the tuner 111, an externally inputted picture (or image) that is inputted through the external device interface unit 115, a picture (or image) that is inputted through the network interface unit, or a picture (or image) that is stored in the storage unit 120 can be displayed on the display unit 240. In this case, the picture (or image) that is displayed on the display unit 240 may be a still picture (or image) or a video, and may be a 2D image or a 3D image.

The panel controller 230 may be configured to implement the functions, procedures, and/or methods of a processor 1230 included in a wireless data receiving device 1200, which will be described with reference to each embodiment of the present specification. Additionally, the processor 1230 may be configured to implement the functions, procedures, and/or methods of the wireless data receiving 1200 that will be described with reference to each embodiment of the present specification.

The user input interface unit 220 may transmit a signal that is inputted, by the user, to the panel controller 230 or may transmit a signal from the panel controller 230 to the user. For example, the user input interface 220 may receive and process control signals, such as power on/off, screen settings, and so on, of the display device 200 from the remote control device 300, or may process control signals received from the panel controller 230 so that the processed signals can be transmitted to the remote control device 300 in accordance with various communication methods, such as Bluetooth, Ultra Wideband (WB), ZigBee, Radio Frequency (RF), or Infrared (IR) communication, and so on.

The user input interface unit 220 may transmit a control signal, which is inputted through a local key (not shown), such as a power key, a volume key, a setup key, and so on, to the panel controller 230.

The power supply unit 260 supplies power to the wireless communication unit 210, the user input interface unit 220, the panel controller 230, the display unit 240, and the audio output unit 250. Methods for receiving power from an external source performed by the power supply unit 260 may include a terminal method and a wireless method. In case the power supply unit 260 receives power by using a wireless method, the power supply unit 260 may include a separate configuration in order to wirelessly receive power. For example, the power supply unit 260 may include a power pick-up unit configured to be magnetically coupled with an external wireless power transmitting device so as to receive wireless power, and a separate communication and control unit configured to perform communication with the wireless power transmitting device in order to receive wireless power and to control transmission and reception of wireless power.

The remote control device 300 performs an operation of remotely controlling various features of the main device 100 or the display device 200, such as power on/off, channel selection, screen setup, and so on. Herein, the remote control device 300 may also be referred to as a "remote controller (or remote)".

Meanwhile, since the main device 100 and the display device 200, which are shown in FIG. 1, are provided only as an example of one embodiment of the present disclosure, some of the illustrated components may be integrated or omitted, or other components may be added according to the specifications of the main device 100 and the display device 200, which are actually implemented. That is, as necessary, two or more components may be integrated into one component, or one component may be divided into two or more components. In addition, a function that is performed in each block is presented to describe an embodiment of the present disclosure, and a specific operation or device will not limit the scope and spirit of the present disclosure.

According to another embodiment of the present disclosure, unlike the example shown in FIG. 1, the main device 100 may receive and play-back (or reproduce) an image (or picture) through the network interface unit 113 or the external device interface unit 115 without including the tuner 111 and the demodulator 112.

For example, the main device 100 may be implemented by being divided into an image processing device, such as a set-top box, for receiving broadcast signals or content according to various network services, and a content playback device for playing content input from the image processing device.

In this case, an operating method of the wireless AV system 10 according to an embodiment of the present disclosure that will hereinafter be described may be performed not only by the main device 100 and the display device 200, as described above with reference to FIG. 1, but also by one of the divided image processing device, such as the set-top box, or content playback device, which includes an audio output unit 250.

In light of system input/output, the main device 100 may be referred to as a wireless source device that wirelessly provides a source, and the display device 200 may be referred to as a wireless sink device that wirelessly receives a source. The wireless source device and the wireless sink device may implement wireless display (WD) communication technologies that are compatible with standards such as wireless HD, wireless home digital interface (WHDI), WiGig, wireless USB, and Wi-Fi display (WFD, which also known as Miracast).

In light of the applications, the main device 100 may be integrated to a form that configures part of a wireless set-top box, a wireless gaming console, a wireless digital video disc (DVD) player, a wireless router, or the like. In this case, the main device 100 may be provided as a wireless communication module or a chip. The display device 200 may be integrated to a form that configures part of a user device or electronic device (e.g., a wireless TV, a wireless monitor, a wireless projector, a wireless printer, a wireless vehicle dashboard display, a wearable device, an augmented-reality (AR) headset, a virtual-reality (VR) headset, or the like) having a display panel so as to display an image and a video. In this case, the display device 200 may be provided in the form of a wireless communication module or chip.

The main device 100 and the display device 200 may be integrated to forms that configure parts of a mobile device. For example, the main device 100 and the display device 200 may be integrated into a mobile terminal including a smartphone, a smartpad, a tablet PC, or other types of wireless communication devices, a portable computer having a wireless communication card, a personal digital assistant (PDA), a portable media player, a digital image capturing device, such as a camera or camcorder, or other flash memory devices having wireless communication capabilities. In this case, the main device 100 and the display device 200 may be provided in the form of wireless communication modules or chips.

Smartphone users may perform streaming or mirroring of a video and an audio, which are outputted by the users' smartphones, tablet PCs, or other computing devices, to another device, such as a television or a projector, in order to provide a higher resolution display or other enhanced user experience.

As described above, the main device 100 may receive an external signal in a wired or wireless format that is related to a medium, such as audio, video, a picture, an image, multimedia, or at least one combination thereof, and the main device 100 may process the received external signal by using various methods, so as to generate a data stream or bitstream, and may transmit the data stream or bitstream to the display device 200 through a wireless interface.

Hereinafter, image (or picture)/video/audio data that are transmitted through a wireless interface will be collectively referred to as wireless data. That is, the main device 100 may wirelessly communicate with the display device 200 and may transmit wireless data. Therefore, in light of a wireless data transceiving system 1000, the main device 100 may be referred to as a wireless data transmitting device 1100, and the display device 200 may be referred to as a wireless data receiving device 1200. Hereinafter, the present disclosure will be described in more detail in light of the wireless data transceiving system 1000. Firstly, a detailed block diagram of the wireless data transceiving system 1000 will be illustrated.

Figure 2:
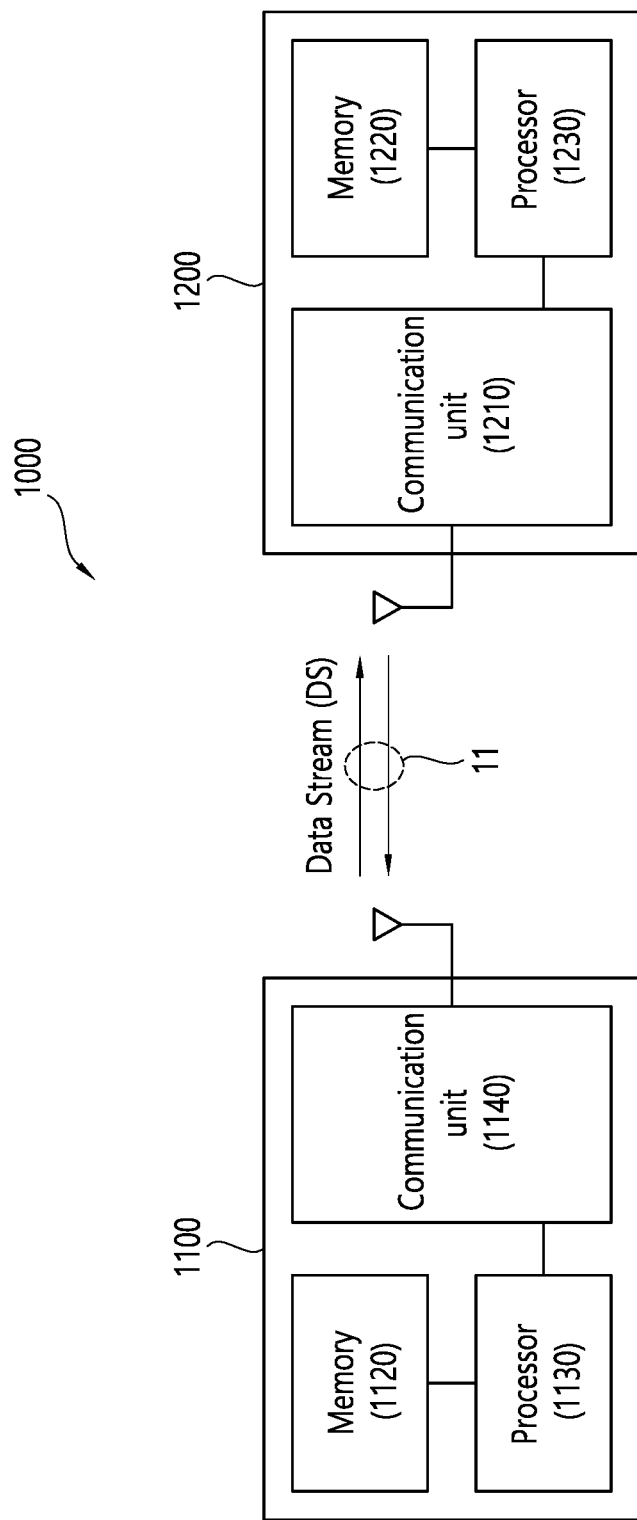
FIG. 2 is a block diagram showing a wireless data transceiving system according to an embodiment of the present disclosure.

FIG. 2 is a block diagram showing a wireless data transceiving system according to an embodiment of the present disclosure.

Referring to FIG. 2, a wireless data transceiving system 1000 refers to a system that wirelessly transmits and receives a data stream. And, the wireless data transceiving system 1000 includes a wireless data transmitting 1100 and at least one wireless data receiving device 1200. The wireless data transmitting device 1100 is communicatively coupled to the at least one wireless data receiving device 1200.

According to an aspect, the data may be configured of an audio, a video, a picture, an image, multimedia, or at least one combination thereof.

According to another aspect, the data may include a bitstream in the form of a compressed audio, a bitstream in the form of a compressed video, a bitstream in the form of a compressed picture, a bitstream in the form of compressed multimedia, or at least one combination thereof. In this case, the wireless data transceiving system 1000 may also be referred to as a wireless compressed data stream transceiving system. Additionally, the wireless compressed data stream transceiving system 1000 may further include a functional or physical unit for compressing data.

Referring to the detailed configuration of each device, the wireless data transmitting device 1100 includes a processor 1130, a memory 1120, and a communication unit 1140, and the wireless data receiving device 1200 includes a communication unit 1210, a memory 1220, and a processor 1230.

The processor 1130 may be configured to implement the functions, procedures, and/or methods of the wireless data transmitting device 1100 that are to be described with reference to each embodiment of the present specification. Also, the processor 1230 may also be configured to implement the functions, procedures, and/or methods of the wireless data receiving device 1200 that are to be described with reference to each embodiment of the present specification. Layers of the wireless interface protocol may be implemented in the processors 1130 and 1230.

In light of the display system in FIG. 1, the processor 1130 may be configured to perform the function of the main controller 130. For example, the processor 1130 may decode a video, an image, a picture, a sound, or data related to a broadcast program that are inputted through the demodulator 112, the external device interface unit 115, or the storage unit 120, may process the decoded data by using various video/audio processing methods, such as compression and encoding, so as to transmit the data through a wireless channel, thereby generating a data stream or bitstream, and may transmit the generated data stream or bitstream to the display device 200 through the communication unit 1140.

The memories 1120 and 1220 are operatively coupled with the processors 1130 and 1230 and store various types of information for operating the processors 1130 and 1230.

The communication units 1140 and 1210 are operatively coupled with the processors 1130 and 1230 and wirelessly transmit and/or receive data. The communication units 1140 and 1210 establish a wireless link 11, and the wireless data transmitting device 1100 and the wireless data receiving device 1200 are inter-connected through the wireless link 11. The communication units 1140 and 1210 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication units 1140 and 1210 may perform communication by using a communication protocol, such as a standard of the IEEE 802.11 series.

Figure 3:
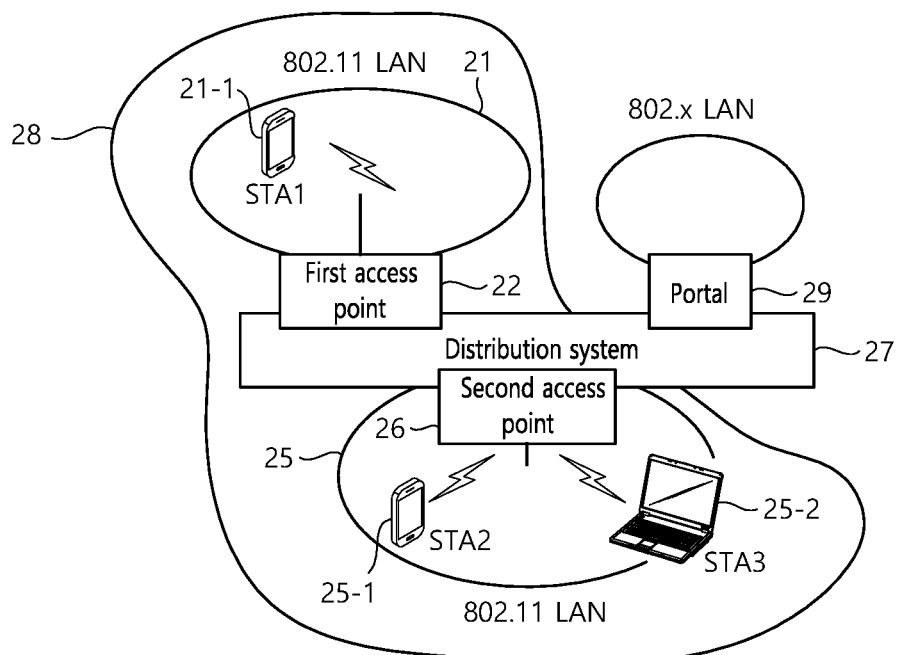
FIG. 3 is a conceptual diagram of a case where the wireless data transceiving system according to an embodiment of the present disclosure is implemented according to an IEEE 802.11 series communication protocol.
Figure 3:
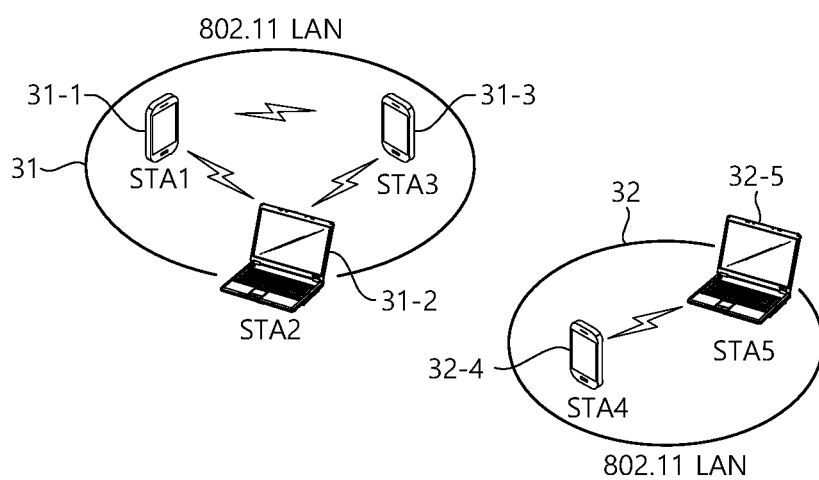

FIG. 3 is a conceptual diagram of a case where the wireless data transceiving system according to an embodiment of the present disclosure is implemented according to an IEEE 802.11 series communication protocol.

Referring to FIG. 3, a wireless data transceiving system 20 in (A) of FIG. 3 may include at least one basic service set (hereinafter referred to as 'BSS') 21 and 25. A BSS is a set consisting of an access point (hereinafter referred to as 'AP') and a station (STA) that are successfully synchronized and, thus, capable of communicating with each other. Herein, the BSS does not refer to a specific region (or area).

For example, a first BSS 21 may include a first AP 22 and one first STA 21-1. A second BSS 25 may include a second AP 26 and one or more STAs 25-1 and 25-2. Herein, the first AP 22 may correspond to the communication unit 1140 of FIG. 2, and the one or more STAs 25-1 and 25-2 may correspond to the communication unit 1210 of FIG. 2.

An infrastructure BSS 21 and 25 may include at least one STA, APs 22 and 26 providing a distribution service, and a distribution system (DS) 27 connecting multiple APs.

The distribution system 27 may implement an extended service set (hereinafter referred to as 'ESS') 28, which is extended by being connected to multiple BSSs 21 and 25. The ESS 28 may be used as a term indicating one network that is configured by connecting one or more APs 22 and 26 through the distribution system 27. At least one AP being included in one ESS 28 may have a same service set identification (hereinafter referred to as 'SSID').

A portal 29 may perform the role of a bridge, which connects the wireless LAN network (IEEE 802.11) with another network (e.g., 802.X).

In a WLAN having the structure shown in (A) of FIG. 3, a network between the APs 22 and 26 and a network between the APs 22 and 26 and the STAs 21-1, 25-1, and 25-2 may be implemented.

Meanwhile, unlike the system shown in (A) of FIG. 3, the wireless data transceiving system 30 shown in (B) of FIG. 3 may be capable of performing communication by establishing a network between the STAs without any APs 22 and 26. A network that is capable of performing communication by establishing a network between the STAs without any APs 22 and 26 is defined as an Ad-Hoc network or an independent basic service set (hereinafter referred to as 'IBSS').

Referring to (B) of FIG. 3, the wireless data transceiving system 30 is a BSS that operates in the Ad-Hoc mode, i.e., an IBSS. Since the IBSS does not include any AP, a centralized management entity that performs a management function at the center does not exist. Therefore, in the wireless data transceiving system 30, STAs 31-1, 31-2, 31-3, 32-4, and 32-5 are managed in a distributed manner. Here, the STAs 31-1, 31-2, 31-3, 32-4, and 32-5 may correspond to the communication unit 1140 or the communication unit 1210 of FIG. 2.

All STAs 31-1, 31-2, 31-3, 32-4, and 32-5 included in the IBSS may be configured as mobile STAs and are not allowed to access a distributed system. All of the STAs included in the IBSS establish a self-contained network.

An STA that is mentioned in the present specification is a random functional medium including a medium access control (hereinafter referred to as 'MAC') and a physical layer interface for a wireless medium according to the regulations of the Institute of Electrical and Electronics Engineers (IEEE) 802.11 standard and may be used to broadly refer to both an AP and a non-AP STA.

An STA that is mentioned in the present specification may be referred to by using various terms, such a mobile terminal, a wireless device, a wireless transmit/receive unit (WTRU), a user equipment (UE), a mobile station (MS), a mobile subscriber unit, and, simply, a user.

Referring back to FIG. 2, a communication channel that is established by the communication units 1140 and 1210 may be a network communication channel. In this case, the communication units 1140 and 1210 may establish a tunneled direct link setup (TDLS) in order to avoid or reduce network congestion. Wi-Fi Direct and TDLS are used for setting up relatively short-range communication sessions. The communication channel that establishes a wireless link 11 may be a communication channel of a relatively short range or a communication channel that is implemented by using a physical channel structure, such as Wi-Fi using a variety of frequencies including 2.4 GHz, 3.6 GHz, 5 GHz, 60 GHz, or ultra-wideband (UWB), Bluetooth, and so on.

While techniques disclosed in the present specification may generally be described in relation with communication protocols, such as the IEEE 802.11 series standard, it will be apparent that aspects of such techniques may also be compatible with other communication protocols. Illustratively and non-restrictively, wireless communication between the communication units 1140 and 1210 may use orthogonal frequency-division multiplexing (OFDM) schemes. Other various wireless communication schemes including, but not limited to, time-division multiple access (TDMA), frequency-division multiple access (FDMA), code-division multiple access (CDMA), or any random combination of OFDM, FDMA, TDMA, and/or CDMA may also be used.

The processors 1130 and 1230 may include an application-specific integrated circuit (ASIC), a different chipset, a logic circuit, and/or a data processor. The memories 1120 and 1220 may include a read-only memory (ROM), a random access memory (RAM), a flash memory, a memory card, a storage medium, and/or another storage device. The communication units 1140 and 1210 may include a baseband circuit for processing radio frequency signals. When an embodiment is implemented as software, the techniques described herein may be implemented as a module (e.g., a procedure, function, and so on) that performs the functions described in the present specification. The module may be stored in the memories 1120 and 1220 and may be executed by the processors 1130 and 1230. The memories 1120 and 1220 may be implemented inside the processors 1130 and 1230. Alternatively, the memories 1120 and 1220 may be implemented outside of the processors 1130 and 1230, and the memories 1120 and 1220 may be communicatively connected to the processors 1130 and 1230 via various well-known means that are disclosed in this technical field.

In light of a wireless communication system (i.e., WLAN, Wi-Fi), the wireless data transmitting device 1100 may be referred to as an AP or a personal basic service set control point (PCP) station, and the wireless data receiving device 1200 may be referred to as an STA or a non-personal basic service set control point (non-PCP) station.

In light of the input/output of a data stream, the wireless data transmitting device 1100 may be referred to as a wireless source device that wirelessly provides a source, and the wireless data receiving device 1200 may be referred to as a wireless sink device that wirelessly receives a source. The wireless source device and the wireless sink device may implement wireless display (WD) communication technologies that are compatible with standards such as wireless HD, wireless home digital interface (WHDI), WiGig, wireless USB, and Wi-Fi display (WFD, which also known as Miracast).

In light of the applications, the wireless data transmitting device 1100 may be integrated to a form that configures part of a wireless set-top box, a wireless gaming console, a wireless digital video disc (DVD) player, a wireless router, or the like. In this case, the wireless data transmitting device 1100 may be provided as a wireless communication module or a chip. And, the wireless data receiving device 1200 may be integrated to a form that configures part of a user device or electronic device (e.g., a wireless TV, a wireless monitor, a wireless projector, a wireless printer, a wireless vehicle dashboard display, a wearable device, an augmented-reality (AR) headset, a virtual-reality (VR) headset, or the like) having a display panel so as to display an image and a video. In this case, the wireless data receiving device 1200 may be provided in the form of a wireless communication module or chip.

The wireless data transmitting device 1100 and the wireless data receiving device 1200 may be integrated to forms that configure parts of a mobile device. For example, the wireless data transmitting device 1100 and the wireless data receiving device 1200 may be integrated into a mobile terminal including a smartphone, a smartpad, a tablet PC, or other types of wireless communication devices, a portable computer having a wireless communication card, a personal digital assistant (PDA), a portable media player, a digital image capturing device, such as a camera or camcorder, or other flash memory devices having wireless communication capabilities. In this case, the wireless data transmitting device 1100 and the wireless data receiving device 1200 may be provided in the form of wireless communication modules or chips.

Smartphone users may perform streaming or mirroring of a video and an audio, which are outputted by the users' smartphones, tablet PCs, or other computing devices, to another device, such as a television or a projector, in order to provide a higher resolution display or other enhanced user experience.

Figure 4:
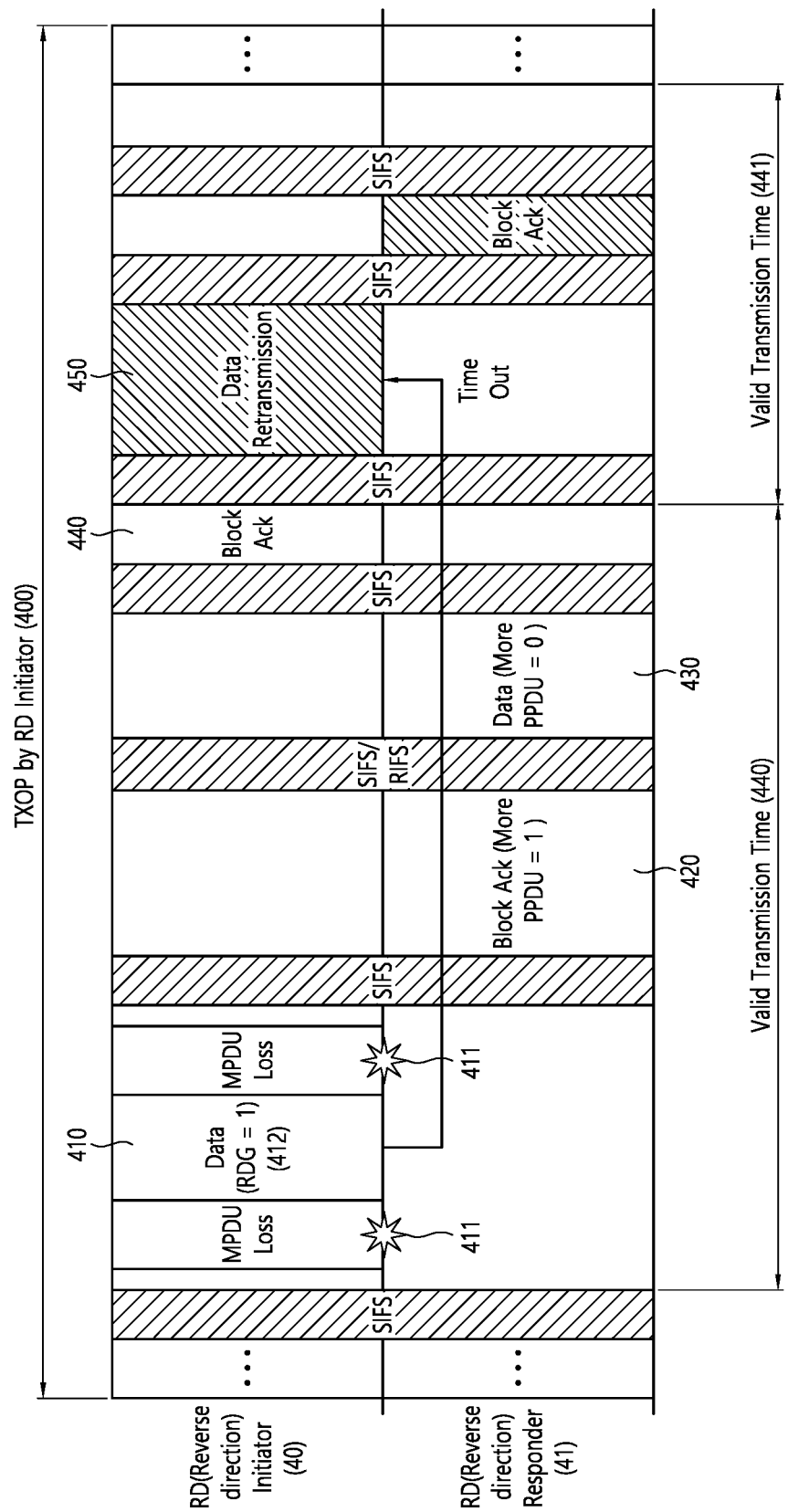
FIG. 4 illustrates a communication procedure based on a reverse direction protocol in a wireless AV system according to an embodiment.

FIG. 4 illustrates a communication procedure based on a reverse direction protocol in a wireless AV system according to an embodiment. This procedure corresponds to a procedure of a reverse direction protocol based on the IEEE 802.11 standard using a radio resource of a 60 HGz band.

Referring to FIG. 4, an initiator 40 obtains a transmission opportunity (TXOP) 400 and has a right to transmit data to a responder 41 within the TXOP. The responder 41 is a device which receives data from the initiator within the TXOP 400 obtained by the initiator 40.

From a perspective of the wireless AV system, the initiator may be a wireless data transmission device, and the responder may be a wireless data reception device. Alternatively, from the perspective of the wireless AV system, the initiator may be a main device, and the responder may be a display device. Alternatively, from the perspective of the wireless AV system, the initiator may be the display device, and the responder may be the main device. That is, when any one device constituting the wireless AV system is used as the initiator, the other device constituting a pair with that device is used as the responder. Although each embodiment is described hereinafter from perspectives of the initiator and the responder for convenience of explanation, both the initiator and the responder are devices capable of performing data transmission and reception. Therefore, both the initiator and the responder may also be called a data transmission and reception device.

A data frame transmitted by the initiator 40 to the responder 41 may be called a forward data frame 410 or a downlink data frame. From a perspective of a medium access control (MAC) layer, the forward data frame 410 may be a MAC protocol data unit (MPDU) or an aggregated MPDU (A-MPDU). From a perspective of a physical (PHY) layer, the forward data frame 410 may be a PHY protocol data unit (PPDU).

The responder 41 generates a block ACK frame 420 indicating whether the forward data frame 410 is successfully received and feeds back it to the initiator 40 after a short inter frame space (SIFS). For example, as shown in FIG. 4, when at least part of the forward data frame 410 fails in transmission (see 411), the responder 41 feeds back the block ACK 420 in which NACK is set for the failed part to the initiator 40.

Meanwhile, the responder 41 may obtain a right to transmit data within the TXOP 400 according to a permission of the initiator 40. As such, when the initiator 40 grants a data transmission right to the responder 41, it is called a reverse direction grant (RDG) 412. In addition, a data frame which is transmitted to the initiator 40 when the responder 41 receives the RDG 412 may be called a reverse data frame 430 or an uplink data frame. Therefore, the responder 41 for which a data transmission right is granted (RDG=1) by means of the RDG 412 may transmit to the initiator 40 a more data field indicating that a buffered reverse data frame is present, and then may transmit the buffered reverse data frame 430 to the initiator 40 after the SFIS. The more data field may also be called a more PPDU field.

When the RDG is activated in such a series of the reverse direction protocol procedures, the initiator and the responder may be respectively called an RD initiator and an RD responder.

Meanwhile, the initiator 40 may identify that a loss occurs in part of the forward data frame 410 from the block ACK frame 420 of the responder, and thus may prepare for retransmission of the forward data frame 410. Since the data transmission right is granted to the responder 41, the initiator 40 may identify that there is data to be transmitted by the responder 41 by means of the more data field. In this case, even if at least part of the forward data frame 410 fails in transmission, the initiator 40 receives the reverse data frame 430 transmitted by the responder 41, instead of retransmitting the forward data frame 410.

Since the wireless AV system is characterized in that seamless streaming data transmission is achieved wirelessly and reproduced in an AV manner, it is very sensitive to delay. Therefore, every data frame shall be transmitted within a time meaningful for a streaming service, which is called a valid transmission time 440. The valid transmission time 440 is preferably designed as a time in which each data frame (or buffered data frame) transmitted by the initiator 40 can be validly used by the responder 41, and may be, for example, 500 us. The valid transmission time may be predetermined when designing the wireless AV system, or may be separately determined by transmitting and receiving information on the valid transmission period between the initiator 40 and the responder 41 through system information or a beacon frame.

A new data frame may be transmitted every valid transmission time 440, and a MAC buffer may be updated according to the valid transmission time 440. For example, a first data frame currently buffered may be transmitted at a first valid transmission time, and when the first valid transmission time elapses, a second data frame may be buffered. Thereafter, the second data frame may be transmitted at the second valid transmission time. That is, each data frame is transmitted or retransmitted within the valid transmission time 440 given for the data frame, but after the valid transmission time 440 elapses, it is no longer valid from a perspective of operating the wireless AV system even if it is transmitted or retransmitted.

In FIG. 4, eventually, retransmission 450 of the forward data frame 410 by the initiator 40 occurs after transmitting a block ACK frame 440 for the reverse data frame 430. However, at this time point, since a time-out of the valid transmission time 400 occurs, the initiator 40 drops or interrupts the retransmission 450 of the forward data frame 410. In addition, the initiator 40 transmits a new forward data frame to the responder 41 at a next valid transmission time 441.

Figure 5:
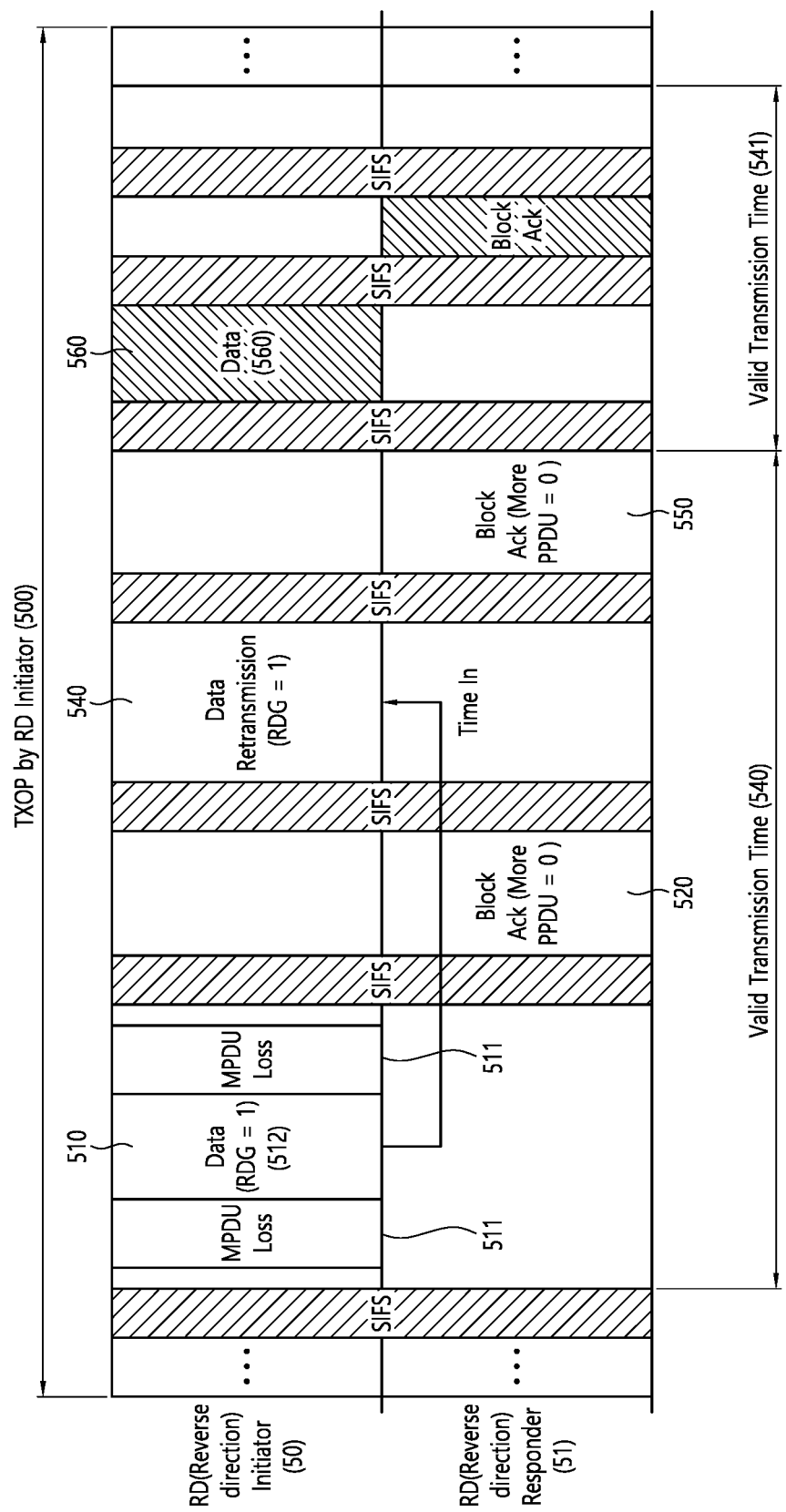
FIG. 5 illustrates a communication procedure based on a reverse direction protocol in a wireless AV system according to another embodiment.

FIG. 5 illustrates a communication procedure based on a reverse direction protocol in a wireless AV system according to another embodiment. The present embodiment provides a method capable of achieving transmission of a reverse data frame while enabling retransmission of a forward data frame within a valid transmission time even if transmission of the forward data frame fails, when an RDG is activated (RDG=1) in the wireless AV system supporting the reverse direction protocol.

In the embodiment of FIG. 5, if an initiator 50 is the wireless data transmission device 1100 and a responder 51 is the wireless data reception device 1200, an operation of the initiator 50 may be an operation of the communication unit 1140, and an operation of the responder 51 may be an operation of the communication unit 1210. Alternatively, in the present embodiment, if the initiator 50 is the wireless data reception device 1200 and the responder 51 is the wireless data transmission device 1100, the operation of the initiator 50 may be the operation of the communication unit 1210, and the operation of the responder 51 may be the operation of the communication unit 1140.

Referring to FIG. 5, the initiator 50 obtains a TXOP 500 and transmits a forward data frame 510 to the responder 51 within the TXOP 500. The forward data frame 510 is prepared to be validly transmitted only within a value transmission time 540. Herein, the forward data frame 510 may include an RDG field which permits or authorizes reverse transmission.

For example, the RDG field may be configured as shown in Table 1.

TABLE 1

| Value | Role of transmitting side | Interpretation of value |
|---|---|---|
| 0 | not RD responder | no reverse grant |
|   | RD responder | PPDU carrying corresponding frame is transmitted last by RD |
| 1 | RD initiator | RDG is present |
|   | RD responder | PPDU carrying corresponding frame is followed by another PPDU |

That is, when the RDG field value is set to 1 from a perspective of the initiator, it indicates that the RDG is present (i.e., reverse transmission is permitted or authorized).

The responder 51 receives the forward data frame 510 including a RDG field 512 (RDG=1) to permit or authorize reverse transmission. Further, the responder 51 generates a block ACK frame 520 indicating whether the forward data frame 510 is successfully received, and feeds back it to the initiator 50 after an SIFS. For example, as shown in FIG. 5, when at least part of the forward data frame 510 fails in transmission (see 511), the responder 51 feeds back the block ACK frame 520 in which NACK is set for the failed part to the initiator 50.

Meanwhile, the responder 51 may be configured to buffer a reverse data frame to be transmitted to the initiator (not shown in the figure). In addition, the buffered reverse data frame may be transmitted within the TXOP 500 by the authorization of the initiator 50. Herein, since at least part of the forward data frame 510 fails in transmission (see 511), when the responder 51 transmits the reverse data frame based on RDG=1, the forward data frame 510 may not be retransmitted within the valid transmission time 540. Therefore, the responder 51 may control retransmission of the forward data frame 510 despite RDG=1 according to a specific criterion.

For example, the responder 51 may set a value of a more data field indicating whether the reverse data frame is present based on whether at least part of the forward data frame 510 fails in reception, and may transmit the more data field to the initiator 50.

For example, when it is identified that at least part of the forward data frame 510 fails in reception, the responder 51 transmits to the initiator 50 the block ACK frame 520 in which NACK is set for the failed data. In addition, the responder 51 may decline the authorization despite RDG=1, and drop, suspend, or postpone the transmission of the buffered reverse data frame. In addition, the responder 51 may transmit the more data field to the initiator 50 by setting "absence of buffered reverse data frame or no more PPDU" (more PPDU=0). Herein, the more data field may be transmitted by being included in the block ACK frame 520.

Upon receiving the more data field, the initiator 50 may perform retransmission 540 of the forward data frame 510 within the valid transmission time 540, and the responder 51 may transmit to the initiator 50 a block ACK frame 550 for the retransmission 540. Accordingly, delay occurring in retransmission of the forward data frame 510 can be reduced, and performance of the wireless AV system can be guaranteed. In addition, a new data frame 560 is transmitted by the responder 50 during a next valid transmission time 541.

As another example, the responder 51 may set a value of a more data field indicating whether the reverse data frame is present, based on whether at least part of the forward data frame 510 fails in reception and priorities of the forward data frame 510 and the buffered revered data frame, and may transmit the more data field to the initiator 50.

For example, when it is identified that at least part of the forward data frame 510 fails in reception, the block ACK frame 520 in which NACK is set for the failed data is generated.

In this case, the responder 51 identifies the priorities of the forward data frame 510 and the buffered reverse data frame.

If the forward data frame 510 has a higher priority than the buffered reverse data frame, the responder 51 may decline the authorization despite RDG=1, and may transmit the more data field to the initiator 50 by setting "absence of buffered reverse data frame or no more PPDU" (more PPDU=0). In addition, the responder 51 may drop, suspend, or postpone the transmission of the buffered reverse data frame. Herein, the more data field may be transmitted by being included in the block ACK frame 520. Upon receiving the more data field, the initiator 50 may perform retransmission 540 of the forward data frame 510 within the valid transmission time 540, and the responder 51 may transmit to the initiator 50 the block ACK frame 550 for the retransmission 540.

Otherwise, if the reverse data frame has a higher priority than the forward data frame 510, the responder 51 may use a right granted for transmission of the reverse data frame to transmit the more data field to the initiator 50 by setting "presence of buffered reverse data frame or more PPDU" (more PPDU=1). In this case, the more data field may be transmitted by being included in the block ACK frame 520. Thereafter, the responder 51 may transmit the reverse data frame to the initiator 50 within the TXOP 500. In this case, as shown in FIG. 4, the initiator 50 does not perform retransmission of the forward data frame, and performs transmission of the new data frame 560 when the next valid transmission time 541 arrives.

Figure 6:
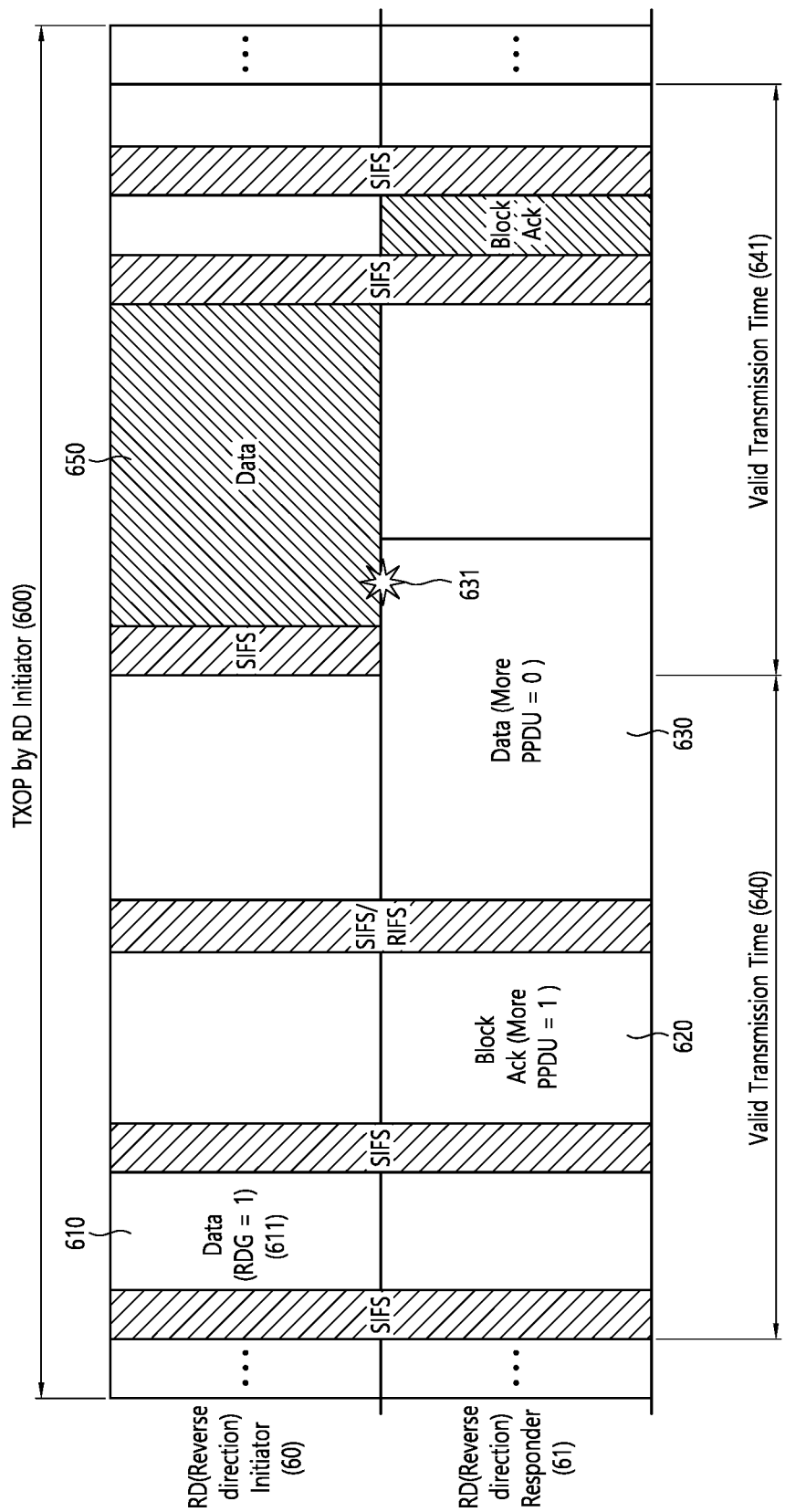

FIG. 6 and FIG. 7 illustrate a communication procedure based on a reverse direction protocol in a wireless AV system according to another embodiment. The present embodiment provides a method enabling retransmission of a reverse data frame within a valid transmission time if transmission of the forward data frame succeeds, when an RDG is activated (RDG=1) in the wireless AV system supporting the reverse direction protocol.

In the embodiment of FIG. 6 and FIG. 7, if an initiator 60 is the wireless data transmission device 1100 and a responder 61 is the wireless data reception device 1200, an operation of the initiator 60 may be an operation of the communication unit 1140, and an operation of the responder 61 may be an operation of the communication unit 1210. Alternatively, in the present embodiment, if the initiator 60 is the wireless data reception device 1200 and the responder 61 is the wireless data transmission device 1100, the operation of the initiator 60 may be the operation of the communication unit 1210, and the operation of the responder 61 may be the operation of the communication unit 1140.

Referring to FIG. 6, the initiator 60 obtains a TXOP 600, and transmits a forward data frame 610 to the responder 61 within the TXOP 600. The forward data frame 610 is prepared to be validly transmitted only within a valid transmission time 640. Herein, the forward data frame 610 may include an RDG field 611 which permits or authorizes reverse transmission. For example, the RDG field may be configured as shown in Table 1 above.

The responder 61 receives the forward data frame 610 including the RDG field 611 (RDG=1) to permit or authorize reverse transmission. Further, the responder 61 generates a block ACK frame 620 indicating whether the forward data frame 610 is successfully received, and feeds back it to the initiator 60 after an SIFS. For example, as shown in FIG. 6, when the forward data frame 610 succeeds in transmission, the responder 61 feeds back the block ACK frame 620 in which ACK is set for the entirety of the forward data frame 610 to the initiator 60.

Meanwhile, the responder 61 may be configured to buffer a reverse data frame 630 to be transmitted to the initiator. In addition, the buffered reverse data frame 630 may be transmitted to the initiator 60 within the TXOP 600 by the authorization of the initiator 60. Herein, since the forward data frame 610 succeeds in transmission, the responder 61 may transmit the reverse data frame 630 within the given valid transmission time 640, based on RDG=1.

However, the reverse data frame 630 may be transmitted by exceeding the remaining valid transmission time 640 according to a size of the reverse data frame 630 (see 631). This is because the remaining TXOP 600 can be used without limitation due to the right of the responder 61. In this case, there is a problem in that a collision occurs with transmission of a new forward data frame 650 of the originally scheduled initiator 60 due to transmission of the reverse data frame 630.

As such, when it is determined that the reverse data frame is transmitted by exceeding the remaining valid transmission time 640 (see 631), as shown in FIG. 7, the responder 61 may transmit a first part 630-1 of the reverse data frame 630 within a first valid transmission time 640, and may delay a transmitting timing of the remaining second part 630-2 of the reverse data frame 630 to a next second valid transmission time 641. To this end, a data transmission duration can be controlled by negotiating occupancy of the TXOP 600 between the initiator 60 and the responder 61. Accordingly, the initiator 60 may periodically transmit a new forward data frame 670 to the responder 61 without a collision for the next valid transmission time 641 during a single TXOP.

Since the device and method for receiving wireless data or the device and method for transmitting wireless data according to the above-described embodiments of the present disclosure do not mandatorily require all of the components or operations that are described above, the device and method for receiving wireless data or the device and method for transmitting wireless data may be performed by including all or part of the above-described components or operations. Additionally, the above-described embodiments of the device and method for receiving wireless data or the device and method for transmitting wireless data may be performed in combination with each other. Furthermore, the above-described components or operations are not mandatorily required to be performed in the order that is described above, and, therefore, it is also possible for components or operations (or process steps) that are described in a later order to be performed before the components or operations (or process steps) that are described in an earlier order.

The foregoing description has been presented merely to provide an exemplary description of the technical idea of the present disclosure, and it will be apparent to those skilled in the art to which the present disclosure pertains, that various changes and modifications in the embodiments described herein can be made without departing from the scope and spirit of the present disclosure. Therefore, the embodiments of the present disclosure described above can be implemented separately or in combination with each other.

The embodiments disclosed herein are provided not to limit the technical idea of the present disclosure but to describe the present disclosure, and the scope of the technical idea of the present disclosure should not be limited to these embodiments. The scope of the present disclosure should be interpreted by the following claims, and all technical ideas within the scope of equivalents thereto should be construed as being included in the scope of the present disclosure.

What is claimed is:

1. An apparatus for performing data transmission and reception in a wireless audio video (AV) system, the apparatus comprising:
a transceiver configured to receive from an initiator a forward data frame and reverse direction grant (RDG) information indicating permission of reverse transmission within a transmission opportunity (TXOP) obtained by the initiator, generate a block ACK frame for the forward data frame to transmit the block ACK frame to the initiator, and buffer a reverse data frame to be transmitted to the initiator; and
a processor coupled to the transceiver and configured to obtain AV data from the forward data frame,
wherein the transceiver sets a value of a more data field indicating whether the reverse data frame is present, based on whether at least part of the forward data frame fails in reception and priorities of the forward data frame and the reverse data frame, and transmits the more data field to the initiator,
wherein, if the transceiver succeeds in reception of the forward data frame, the transceiver sets the value of the mode data field to indicate that the reverse data frame is present, and transmits at least part of the reverse data frame within a valid transmission time, and
wherein, if it is determined that the reverse data frame is transmitted by exceeding the valid transmission time, the transceiver transmits a first part of the reverse data frame within the valid transmission time, and delays a transmission timing of a second part which is the remaining part of the reverse data frame to a next valid transmission time.

2. The apparatus of claim 1, wherein, if the transceiver fails in reception of at least part of the forward data frame, and the forward data frame has a higher priority than the reverse data frame, the transceiver sets the value of the more data field to indicate that the reverse data frame is not present, even if the reverse data frame is buffered.

3. The apparatus of claim 1, wherein, if the transceiver fails in reception of at least part of the forward data frame, and the forward data frame has a higher priority than the reverse data frame, the transceiver sets the value of the more data field to indicate that a transmission timing of the reverse data frame is delayed.

4. The apparatus of claim 2, wherein the transceiver delays the transmitting timing of the buffered reverse data frame within a valid transmission time,
wherein the valid transmission time is designed as a time in which data transmitted by the initiator can be validly used.

5. The apparatus of claim 1, wherein, if the communication fails in reception of at least part of the forward data frame, the transceiver sets the block ACK to NACK so that the forward data frame is received again from the initiator.

6. The apparatus of claim 1, wherein the forward data frame is data stored in a buffer of the initiator,
wherein the buffer of the initiator is updated to new data in units of a valid transmission time.

7. An apparatus of performing data transmission and reception in a wireless audio video (AV) system, the apparatus comprising:

a transceiver configured to obtain a transmission opportunity (TXOP) for transmitting to a responder a forward data frame to be buffered, transmit to the responder the forward data frame and reverse direction grant (RDG) information indicating permission of reverse transmission within the TXOP, and receive from the responder a block ACK frame for the forward data frame; and a processor coupled to the transceiver and coupled to transfer AV data for the forward data frame to the transceiver, wherein the transceiver receives from the responder a value of a more data field indicating whether the reverse data frame is present, based on whether at least part of the forward data frame fails in reception and priorities of the forward data frame and the reverse data frame, wherein, if the transceiver succeeds in reception of the forward data frame, the transceiver sets the value of the mode data field to indicate that the reverse data frame is present, and transmits at least part of the reverse data frame within a valid transmission time, and wherein, if it is determined that the reverse data frame is transmitted by exceeding the valid transmission time, the transceiver transmits a first part of the reverse data frame within the valid transmission time, and delays a transmission timing of a second part which is the remaining part of the reverse data frame to a next valid transmission time.

8. The apparatus of claim 7, wherein, if the responder fails in reception of at least part of the forward data frame, and the forward data frame has a higher priority than the reverse data frame, the value of the more data field is set to indicate that the reverse data frame is not present, even if the reverse data frame is buffered.

9. The apparatus of claim 7, wherein, if the responder fails in reception of at least part of the forward data frame, and the forward data frame has a higher priority than the reverse data frame, the value of the more data field is set to indicate to the responder that a transmission timing of the buffered reverse data frame is delayed.

10. The apparatus of claim 8, wherein the transmitting timing of the buffered reverse data frame is delayed within a valid transmission time, wherein the valid transmission time is designed as a time in which the forward data frame can be validly used by the responder.

11. The apparatus of claim 7, wherein, if the responder fails in reception of at least part of the forward data frame, the transceiver retransmits the forward data frame to the responder.

* * * * *